Nov. 21, 1961  R. P. SCHAKE  3,010,026

ELECTRICAL RELAY

Filed Sept. 22, 1958

RICHARD P. SCHAKE
INVENTOR.

BY
Rudolph J. Juick
ATTORNEY 3,010,026
Patented Nov. 21, 1961

3,010,026
ELECTRICAL RELAY

Richard P. Schake, Bloomfield, N.J., assignor to Daystrom, Inc., Murray Hill, N.J., a corporation of New Jersey
Filed Sept. 22, 1958, Ser. No. 762,342
5 Claims. (Cl. 250—231)

This invention relates to an electrical relay and more particularly to a contactless, photoelectric, fully indicating relay of the instrument type.

Many instrumentation applications include a low output transducer, such as a thermocouple or photovoltaic cell, to drive an indicator over a specified range of values of the parameter under measurement and also to open or close an external control circuit at some intermediate value within the range. Common prior art practice in such cases includes either using a relay with a scale calibrated up to the intermediate relaying point in which case the value of the parameter above that point is unknown, or using both a relay and an indicator, in which case either performance or sensitivity is limited by the division of the available energy from the transducer between the two devices. In addition to these drawbacks, contact making devices either provide problems in obtaining sufficient torque to maintain contact closure, or require a resetting device after each closure.

In the instrument relay of this invention, all of the above described limitations or drawbacks are either eliminated or substantially reduced. My novel relay comprises a sensitive calibrated electric indicating instrument of the galvanometer type, or the like, which includes a staff upon which is mounted, in addition to the usual pointer, an opaque vane. A tube, having a slit therein, is located within the instrument, and a lamp and photosensitive resistor are mounted at the opposite ends of the tube. The opaque vane is adapted to pass through the slit in the tube and interrupt the illumination from the lamp to the photo-resistive element. The photosensitive element is connected in series circuit with a power supply and a relay and, when exposed to illumination from the light source, presents a small resistance whereby the relay is energized. When the light beam is interrupted by the opaque vane passing through the slit in the tube, the resistance of the photo-sensitive element increases and the relay is deenergized. The shape of the vane and shape of the light opening between the light source and photo-sensitive element are such that the light beam is interrupted for a selected range of values of the parameter measured.

An object of this invention is the provision of an instrument type relay having the highly desirable characteristics of high reliability and high sensitivity.

An object of this invention is the provision of a contactless, photoelectric, fully indicating instrument type relay requiring extremely low input power whereby the instrument is particularly adapted for use with low output transducers, such as thermocouples, photovoltaic cells, and the like.

An object of this invention is the provision of a relay system which includes a sensitive instrument type relay and power relay controlled by the instrument type relay, whereby a low output transducer may be used to drive the system.

An object of this invention is the provision of a sensitive instrument type relay comprising a calibrated galvanometer type indicator which includes a movable coil and pointer attached thereto, an opaque vane mounted on the movable coil, a tube having a slit intermediate the ends and a photoresistive cell and light source adjacent the opposite ends thereof, a narrow light slot formed in the tube end intermediate the light source and photoresistive cell, the said opaque vane having an edge which parallels the slot edges in a predetermined position of the opaque vane in the slit in the tube to provide a sharp cut-off of the light beam.

These and other objects and advantages will become apparent from the following description when taken with the accompanying drawings. It will be understood that the drawings are for purposes of illustration and are not to be construed as defining the scope or limits of the invention, reference being had for the latter purpose to the appended claims.

In the drawings, wherein like reference characters denote like parts in the several views.

Figure 1:
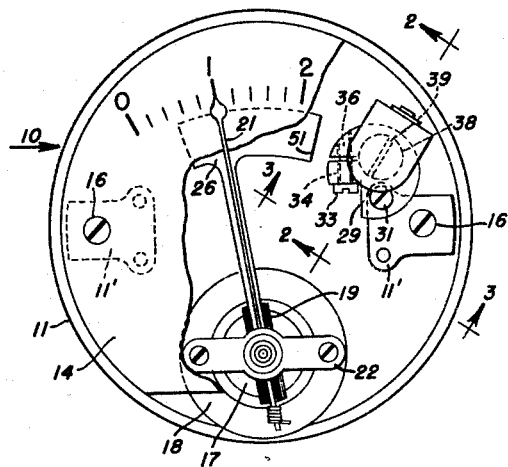
FIGURE 1 is a front view of the instrument with the case removed and a portion of the scale plate broken away for clarity.
Figure 2:
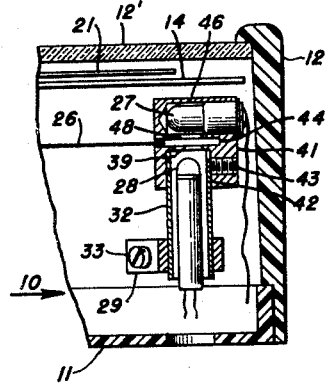
FIGURE 2 is a sectional view taken on line 2—2 of FIGURE 1.
Figure 3:
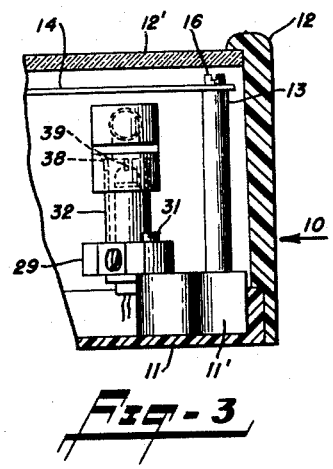
FIGURE 3 is a sectional view taken on line 3—3 of FIGURE 1.

Reference is first made to FIGURES 1 to 3 of the drawings wherein various views of the instrument type relay, designated 10, are shown, and which includes a housing comprising a base 11 and cylindrical case 12 of suitable plastic material. A glass window 12', as seen in FIGURES 2 and 3, is retained in the case by any suitable means not shown in the drawings. Studs 13 are molded in bosses 11' formed on the base 11, and carry a scale plate 14 having suitable markings thereon, which scale plate is secured thereto by screws 16.

The base 11 supports the instrument mechanism, seen in FIGURE 1 of the drawings, and illustrated as comprising a substantially cylindrical permanent magnet 17 spaced from a generally-cylindrical soft iron yoke 18. A wire wound movable coil 19, carrying a pointer 21, is pivoted for rotation in the magnetic flux gap established between the magnet core and yoke. The movable coil rotates through an angle which varies with the magnitude of the current flowing in the coil, the current being conducted to the coil through spiral hair springs not shown, but in a manner well known in the art. As is common practice, the movable coil is carried by axially aligned pivots (not shown) carried by bridge members 22, which are secured to the yoke 18 and disposed on opposite sides of the mechanism, only the upper bridge member being visible in FIGURE 1. The instrument mechanism is secured to the base 11 by any suitable means not shown in the drawings.

In addition to the instrument pointer 21, a vane 26 of opaque material is attached to the movable coil 19. In accordance with my invention, the vane 26 is adapted to interrupt a light beam, supplied by a lamp 27 to a photosensitive resistor 28, at a predetermined value of the parameter measured by the instrument and for a selected range thereof. With the novel construction of my invention, the light beam is interrupted at a precise predetermined value for highly accurate control.

The mounting arrangement for the lamp and photosensitive resistor includes a split collar 29 attached to one boss 11', formed on the instrument base, by means of a screw 31. A tube 32, which is open at the lower end thereof, is positioned in the bore of the split collar, and secured therein upon tightening of the clamping screw 33 which extends through a through hole 34 in one portion of the collar and is threaded in a tapped hole 36 in another portion thereof, in a conventional manner. Upon loosening of the clamping screw 33, it will be noted that the tube 32 is both vertically and rotatably adjustable within the collar 29. The top of the tube 32 is provided with an end wall 38 having a narrow slot 39 formed therein through which light from the lamp to the photosensitive resistor may pass. The slot 39, as illustrated, desirably lies along a radius from the axis of rotation of the coil 19 and its vane 26. The photosensitive resistor 28 is shown enclosed in a glass capsule which is suitably secured within the tube 32.

A casing member 41 is mounted on the top of the tube 32. As best seen in FIGURES 2 and 3, the casing is provided with a bore 42 within which bore the tube 32 is secured by a set screw 43. The upper end of the bore 42 terminates in a slot 44 formed in the side of the casing member, through which slot the vane 26 is adapted to pass. An internal annular shoulder and external groove on the bore 42 and on the tube 32, respectively, cooperate to limit the engagement of the tube and casing; the upper surface of the wall 38 on the tube terminating substantially in the plane of the lower surface of the slot 44 in the casing, in the engaged position.

A generally horizontal lamp receiving bore 46 is formed in the casing, extending from one side thereof. The base of the lamp 27 is in tight frictional engagement with the bore, thereby providing support for the lamp and electrical connection of the lamp to the casing. An aperture 48 provides light communication between the lamp receiving bore 46 and the slot 44, directly above the slot 39 formed in the top of the tube 32.

In operation, when the potential input to the movable coil 19 of the instrument reaches a predetermined magnitude, the opaque vane attached thereto enters the slot 44 in the casing 41 and interrupts the light beam from the lamp 27. With the usual photosensitive resistor, the resistance increases substantially when the light thereon is blocked by the vane. The vane and walls of the slot 44, as well as the top outer surface of the end wall 38, are preferably colored black, by painting, or other suitable means, to reduce light reflection thereat to a minimum.

It will be noted that the leading edge, designated 51, of the vane 26 (that is, the edge of the vane which first enters the slot 44 upon rotation of the vane) is radial to its axis of rotation so as to be aligned parallel to the long dimension of the slot 39 in the tube end when the leading edge is directly over the slot. In other words, at cut-off, said leading edge lies in the vertical plane of, or is vertically coplanar with, said slot. In this manner, the light beam is interrupted at a substantially precise predetermined position of the vane, and the resistance of the photoresistor exhibits a large resistance change as the vane passes through the said predetermined position.

The use of an elongated slot and a vane having an edge substantially parallel therewith at the point that the vane passes over the slot, forms one important feature of my invention. The use of such an arrangement results in a relay mechanism of great accuracy.

It will be noted that the value of the parameter being measured is indicated by the position of the pointer along a suitable scale on the scale plate 14. Since the vane 26 is free to pass through the slot 44, the value of the parameter above the relaying point (the point at which the light beam is interrupted by the vane) is also indicated. Further, the vane may be made of an elongated shape and may be offset from the pointer 21 circumferentially toward its leading or cut-off edge, as shown in FIGURE 1, such that the light beam is interrupted over a desired range of values of the parameter measured.

Figure 4:
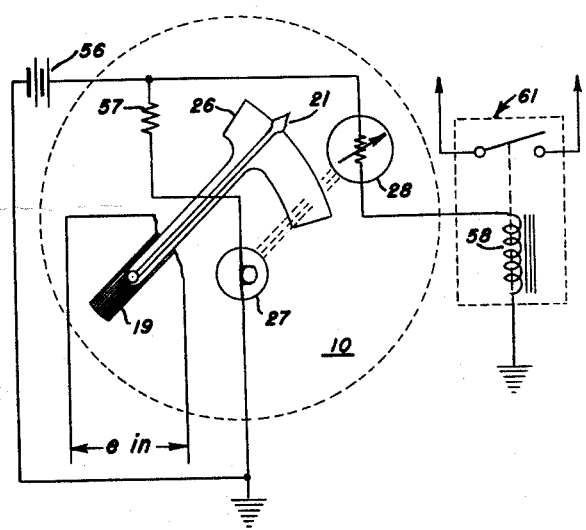
FIGURE 4 is a schematic circuit diagram which includes the instrument.

Reference is now made to FIGURE 4, wherein there is shown a schematic circuit diagram which includes the instrument relay 10. The input potential $e_{in}$, connected to the movable coil 19, is derived from a transducer such as a thermocouple or photovoltaic cell. A suitable source of potential 56 is connected across the lamp 27 through a series dropping resistor 57, if required, whereby the lamp provides illumination to the photosensitive resistor 28, when the beam is uninterrupted by the vane 26. The photoresistor 28 is connected in series with the control winding 58 of a power relay, designated 61. The relay contacts may be connected to any desired utilization circuit, not shown. The potential source 56 is capable of supplying a large current through the relay control winding during the time the photosensitive resistor 28 is illuminated by light from the lamp 27 to thereby energize the relay. When the illumination to the photoresistor is blocked, the resistance thereof increases substantially thereby reducing the current flow through the control winding 58 sufficiently such that the relay is deenergized.

Obvious advantages result from the use of the instrument type relay of my invention. It will be seen that the novel relay contains no contacts, requires of the transducer only the energy necessary to drive the indicator plus a small amount to cover the weight of the vane, provides full indication over the desired range including the range beyond the control point, permits the use of a control range as distinguished from a control point, permits the use of several control points or ranges with a suitably shaped vane, or vanes, not shown, and operates at a precise predetermined control point.

Having now described my invention in detail, in accordance with the patent statutes, various changes and modifications will suggest themselves to those skilled in this art. It is intended that such changes and modifications shall fall within the spirit and scope of the invention as recited in the following claims.

I claim:

1. In an instrument type relay having a coil pivotally mounted about an axis and comprising a flat scale plate, a pointer above and an opaque vane beneath said scale plate, both independently attached to the coil and in planes perpendicular to said axis, a light source mounted on the instrument, a photosensitive device mounted on the instrument a spaced distance from the light source, a tube positioned between the light source and device and having an axis substantially parallel to the coil axis whereby the device is illuminated by the light source through the tube, means forming a slot in the side of the tube, the said opaque vane entering the slot and blocking the illumination to the device at a predetermined pivotal position of the coil, an opaque wall formed in the tube, and means forming a slot through the wall through which slot illumination from the light source to the device may pass.

2. The invention as recited in claim 1 wherein one edge of the said vane is substantially parallel to the said slot through the wall when the edge is positioned in a plane extending through the light source, device, and slot through the wall.

3. In an instrument type relay having a coil pivotally mounted about an axis, a pointer attached to the coil, and a scale plate cooperating with the pointer; an opaque vane attached to the coil and movable therewith, a tube mounted on the instrument and having an axis substantially parallel to the coil axis, a photosensitive resistor mounted in the tube, an end wall on one end of the tube, means forming a slot through the end wall, a casing having a slot formed therein, means forming a first bore in the casing extending from one wall of the casing slot to an outer casing wall, the walled end of the tube extending into the said first bore and supporting the casing, a lamp receiving aperture formed in the casing, means forming a second bore in the casing communicating with the said lamp receiving bore and casing slot, the said second bore terminating in the wall of the casing slot opposite the first bore, and a lamp mounted in the lamp receiving bore, the opaque vane being movable into the slot in the casing to block the illumination from the lamp to the photosensitive resistor at a predetermined angular position of the coil.

4. The invention as recited in claim 3 wherein one edge of the vane is substantially parallel to the said slot when the edge is substantially in alignment with the lamp, photosensitive resistor, and slot.

5. An instrument type relay having a coil pivotally mounted about an axis, a pointer carried thereby, a flat scale plate over which said pointer moves to indicate the magnitude of a parameter being measured, a light source carried by said instrument, a photosensitive device also carried by said instrument and positioned from said light source along a line parallel to said axis, a tube having its axis substantially parallel to said coil axis, said photosensitive device being mounted in said tube, the tube being provided with a slot in the otherwise closed end adjacent the light source, an opaque vane also carried by said coil, extending circumferentially a substantial distance, lying beneath said scale plate in a plane perpendicular to said axis and movable between said light source and the slot end of said tube, the upscale edge of said vane lying on a radius from said axis, said slot being disposed in a plane radial to said axis, whereby the vane, upon energization of the coil to a predetermined extent, cuts off the illumination from said light source to said device at an accurately predetermined position of said coil.

References Cited in the file of this patent

UNITED STATES PATENTS

| | | |
|---|---|---|
| 2,337,535 | Acs | Dec. 28, 1943 |
| 2,629,005 | Engelhard | Feb. 17, 1953 |
| 2,765,986 | Pompetti et al. | Oct. 9, 1956 |

FOREIGN PATENTS

| | | |
|---|---|---|
| 210,878 | Australia | Feb. 7, 1957 |